(12) United States Patent
Mu et al.

(10) Patent No.: US 9,484,838 B2
(45) Date of Patent: Nov. 1, 2016

(54) INVERTER AND POWER SUPPLYING METHOD THEREOF AND APPLICATION USING THE SAME

(71) Applicants: FSP-Powerland Technology Inc., Nanjing (CN); FSP TECHNOLOGY INC., Taoyuan County (TW)

(72) Inventors: Jian-Guo Mu, Nanjing (CN); Feng Ji, Nanjing (CN); Xiong Fang, Nanjing (CN); Chuan-Yun Wang, Nanjing (CN); Ming Xu, Nanjing (CN)

(73) Assignees: FSP-Powerland Technology Inc., Nanjing (CN); FSP TECHNOLOGY INC., Taoyuan (TW)

( * ) Notice: Subject to any disclaimer, the term of this patent is extended or adjusted under 35 U.S.C. 154(b) by 190 days.

(21) Appl. No.: 14/331,213

(22) Filed: Jul. 14, 2014

(65) Prior Publication Data

US 2015/0049525 A1 Feb. 19, 2015

(30) Foreign Application Priority Data

Aug. 14, 2013 (CN) .......................... 2013 1 0353048

(51) Int. Cl.
*H02M 5/458* (2006.01)
*H02M 7/5387* (2007.01)
*H02M 3/335* (2006.01)
*H02M 1/00* (2006.01)

(52) U.S. Cl.
CPC ..... *H02M 7/53871* (2013.01); *H02M 3/33561* (2013.01); *H02M 2001/0006* (2013.01); *H02M 2001/007* (2013.01)

(58) Field of Classification Search
CPC .................. H02M 3/33561; H02M 2001/007; H02M 3/335; H02M 3/337; H02M 5/4585; H02J 3/383
USPC .................... 363/15, 17, 34, 35, 37
See application file for complete search history.

(56) References Cited

U.S. PATENT DOCUMENTS

| | | | |
|---|---|---|---|
| 8,946,937 B2* | 2/2015 | Stratakos | H02J 3/383 307/104 |
| 9,077,262 B2* | 7/2015 | Melanson | H02M 1/14 |
| 2010/0246224 A1* | 9/2010 | Zhang | H02J 1/102 363/123 |

* cited by examiner

*Primary Examiner* — Yemane Mehari
(74) *Attorney, Agent, or Firm* — Jianq Chyun IP Office (57) ABSTRACT

An inverter and a power supply method thereof and an application thereof are provided. The inverter includes a DC-DC conversion circuit, an inverting circuit and an auxiliary power circuit. The DC-DC conversion circuit converts a DC input voltage into a DC bus voltage. The inverting circuit is configured to convert the DC bus voltage into an AC output voltage. The auxiliary power circuit is enabled in response to the DC input voltage, and the auxiliary power circuit generates a first auxiliary power for enabling the DC-DC conversion circuit after being enabled. The DC-DC conversion circuit is enabled in response to the first auxiliary power, and the DC-DC conversion circuit generates a second auxiliary power for enabling the inverting circuit after being enabled, such that the inverting circuit is enabled in response to the second auxiliary power and generates the AC output voltage.

13 Claims, 6 Drawing Sheets

INVERTER AND POWER SUPPLYING METHOD THEREOF AND APPLICATION USING THE SAME

CROSS-REFERENCE TO RELATED APPLICATION

This application claims the priority benefit of China application serial no. 201310353048.6, filed on Aug. 14, 2013. The entirety of the above-mentioned patent application is hereby incorporated by reference herein and made a part of this specification.

BACKGROUND

Technical Field

The invention relates to a power conversion technique. Particularly, the invention relates to an inverter and a power supplying method thereof and an application using the same.

Related Art

In a design of an inverter, an auxiliary circuit thereof (for example, a control portion, a driving portion or a communication portion) generally requires different isolated voltages (for example, 12V, 5V) to serve as power supplies. It is meaningful for ensuring a high efficiency and stable operation of the inverter by designing a reliable auxiliary power supply with a simple structure to supply the auxiliary power to the auxiliary circuit.

In an existing technique, a flyback converter is generally used to serve as a power supplying circuit for providing the auxiliary power. However, in some applications of the inverter, using the flyback converter to supply the auxiliary power to the inverter may cause unexpected power waste. For example, when the inverter is applied to a photovoltaic grid-connected system (the inverter is referred as a photovoltaic inverter), since a direct current (DC) input voltage of the photovoltaic inverter is an output of a photovoltaic module, and the output of the photovoltaic module relates to an intensity of the sunlight, a magnitude of the DC input voltage actually received by the photovoltaic inverter is varied along with time, thus the photovoltaic inverter is not maintained to operate under a rated power. In detail, most of the operational time of the photovoltaic inverter is working under a light load state, so that the actual power conversion efficiency of the photovoltaic inverter is not only evaluated according to the power conversion efficiency under the rated power, but also required to satisfy a demand of European efficiency (i.e. a power conversion efficiency calculated by accumulating different loads according to different weights).

Due to a high voltage stress of the flyback converter and a feature of hard switching, the power conversion efficiency of the inverter working under the light load state is low. As a result, it is hard to enhance the European efficiency of the photovoltaic inverter adopting the flyback converter as the auxiliary power circuit.

SUMMARY

The invention is directed to an inverter which can enhance the power converting efficiency during a light load state.

The invention provides an inverter including a DC-DC conversion circuit, an inverting circuit and an auxiliary power circuit. The DC-DC conversion circuit receives a DC input voltage from a DC input side, and converts the DC input voltage into a DC bus voltage. The inverting circuit is coupled to the DC-DC conversion circuit, and is configured to convert the DC bus voltage into an alternating current (AC) output voltage. The auxiliary power circuit is coupled to the DC-DC conversion circuit, and receives the DC input voltage from the DC input side. The auxiliary power circuit is enabled in response to the DC input voltage, and the auxiliary power circuit generates a first auxiliary power for enabling the DC-DC conversion circuit after the auxiliary power circuit is enabled. The DC-DC conversion circuit is enabled in response to the first auxiliary power, and the DC-DC conversion circuit generates a second auxiliary power for enabling the inverting circuit after the DC-DC conversion circuit is enabled, such that the inverting circuit is enabled in response to the second auxiliary power and generates the AC output voltage.

In an embodiment of the invention, the DC-DC conversion circuit includes a first switch circuit, an isolation transformer, a rectifier and filter circuit, and a first auxiliary circuit. The first switch circuit receives the DC input voltage from the DC input side. The isolation transformer has a primary winding, a first secondary winding and a second secondary winding, where the primary winding is coupled to the first switch circuit. The rectifier and filter circuit is coupled between the isolation transformer and the inverting circuit, and is configured to rectify and filter outputs of the first and the second secondary windings, where the rectifier and filter circuit generates the DC bus voltage according to the output of the first secondary winding, and generates the second auxiliary power according to the output of the second secondary winding. The first auxiliary circuit is coupled to the auxiliary power circuit, where the first auxiliary circuit operates under the first auxiliary power to provide a first auxiliary function to the DC-DC conversion circuit.

In an embodiment of the invention, the inverting circuit includes a second switch circuit and a second auxiliary circuit. The second switch circuit is coupled to the first secondary winding via the rectifier and filter circuit for receiving the DC bus voltage. The second auxiliary circuit is coupled to the second secondary winding via the rectifier and filter circuit, where the second auxiliary circuit operates under the second auxiliary power to provide a second auxiliary function to the inverting circuit.

In an embodiment of the invention, the first auxiliary circuit includes a first control circuit configured to control the operation of the first switch circuit, and the second auxiliary circuit includes a second control circuit configured to control the operation of the second switch circuit.

In an embodiment of the invention, at least one of the first auxiliary circuit and the second auxiliary circuit includes at least one of an over voltage protection circuit, an over load protection circuit and an over current protection circuit.

In an embodiment of the invention, the DC-DC conversion circuit is an isolated DC-DC converter.

In an embodiment of the invention, the auxiliary power circuit is a non-isolated DC-DC converter.

The invention provides a photovoltaic grid-connected system including a photovoltaic module and an inverter. The inverter is coupled to the photovoltaic module with a DC input side, and receives the output of the photovoltaic module as a DC input voltage. The inverter includes a DC-DC conversion circuit, an inverting circuit, and an auxiliary power circuit. The DC-DC conversion circuit receives the DC input voltage from the DC input side and converts the DC input voltage into a DC bus voltage. The inverting circuit is coupled to the DC-DC conversion circuit and is configured to convert the DC bus voltage into an alternating current (AC) output voltage. The auxiliary power circuit is coupled to the DC-DC conversion circuit and receives the DC input voltage from the DC input side. The auxiliary power circuit is enabled in response to the DC input voltage and generates a first auxiliary power for enabling the DC-DC conversion circuit after the auxiliary power circuit is enabled. The DC-DC conversion circuit is enabled in response to the first auxiliary power and generates a second auxiliary power for enabling the inverting circuit after the DC-DC conversion circuit is enabled, such that the inverting circuit is enabled in response to the second auxiliary power and generates the AC output voltage.

The invention provides a power supplying method of an inverter, which includes following steps. A DC input voltage is received from a DC input side of a DC-DC conversion circuit to enable an auxiliary power circuit. A first auxiliary power for enabling and supporting the DC-DC conversion circuit is generated by the enabled auxiliary power circuit. The DC input voltage is converted into a DC bus voltage by the enabled DC-DC conversion circuit, and a second auxiliary power for enabling and supporting an inverting circuit is generated. The DC bus voltage is converted into an AC output voltage by the enabled inverting circuit.

According to the above descriptions, the invention provides an inverter and a power supplying method and an application using the same. In the inverter, the DC-DC conversion circuit of a previous stage is used to generate the auxiliary power required by the inverting circuit of a post stage, such that the auxiliary power circuit is only required to supply the auxiliary power to the DC-DC conversion circuit. Since the auxiliary power circuit is unnecessary to supply power to the inverting circuit, the auxiliary power circuit is adapted to be implemented by a non-isolated DC-DC converter, so as to decrease the power loss of the auxiliary power circuit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

An embodiment of the invention provides an inverter and a power supplying method and an application using the same. In the present embodiment, an auxiliary power required by a post-stage circuit may be generated by a previous-stage circuit, such that an auxiliary power circuit in the inverter is only required to supply an auxiliary power to the previous-stage circuit. Since the auxiliary power circuit is unnecessary to supply power to the post-stage circuit, the auxiliary power circuit can be implemented by a non-isolated DC-DC converter, so as to decrease the power loss of the auxiliary power circuit. Reference will now be made in detail to the present preferred embodiments of the invention, examples of which are illustrated in the accompanying drawings. Wherever possible, the same reference numbers are used in the drawings and the description to refer to the same or like parts.

Figure 1:
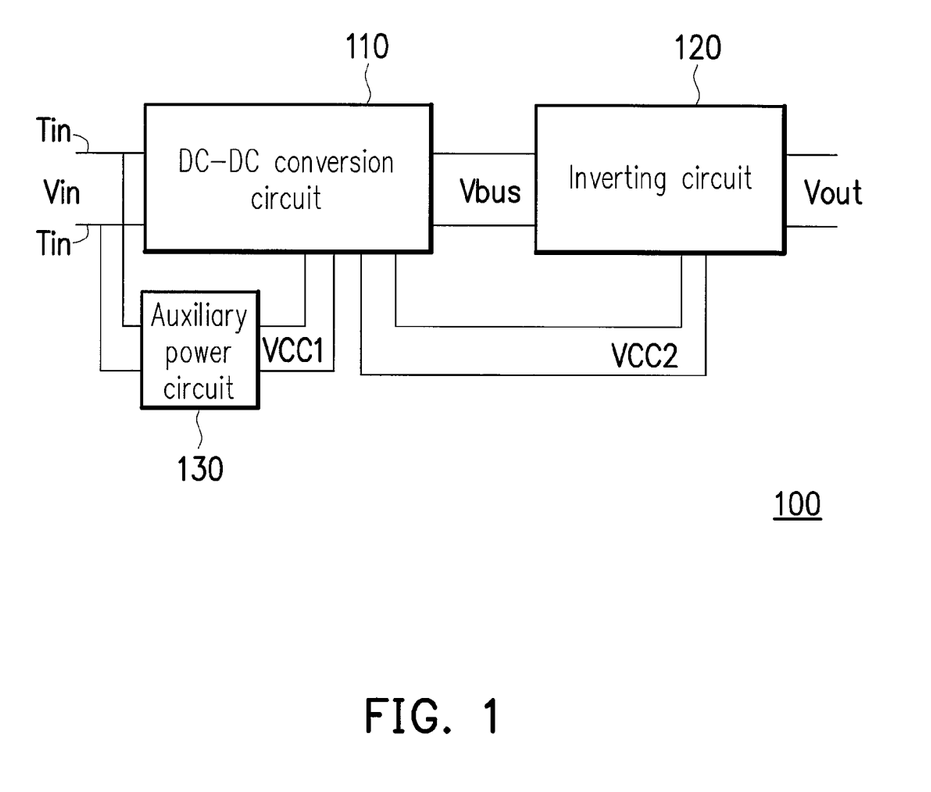
FIG. 1 is a schematic diagram of an inverter according to an embodiment of the invention.

FIG. 1 is a schematic diagram of an inverter according to an embodiment of the invention. Refer to FIG. 1; the inverter 100 includes a DC-DC conversion circuit 110, an inverting circuit 120 and an auxiliary power circuit 130.

The DC-DC conversion circuit 110 receives a DC input voltage Vin from a DC input side Tin, and converts the DC input voltage Vin into a DC bus voltage Vbus. The inverting circuit 120 is coupled to the DC-DC conversion circuit 110 for receiving the DC bus voltage Vbus, and is configured to convert the DC bus voltage Vbus into an AC output voltage Vout. The DC-DC conversion circuit 110 and the inverting circuit 120 construct a two-stage inverter circuit structure. The auxiliary power circuit 130 is coupled to the DC-DC conversion circuit 110, and receives the DC input voltage Vin from the DC input side Tin to supply power to the DC-DC conversion circuit 110 disposed as the previous stage. The power required by the inverting circuit 120 disposed as the post stage is provided by the DC-DC conversion circuit 110.

In detail, in the present embodiment, when the DC input side Tin receives the DC input voltage Vin, the auxiliary power circuit 130 is enabled in response to the received DC input voltage Vin. Then, the auxiliary power circuit 130 generates an auxiliary power VCC1 for enabling and supporting the DC-DC conversion circuit 110.

After the DC-DC conversion circuit 110 is enabled in response to the auxiliary power VCC1, the DC-DC conversion circuit 110 starts to perform a boost or buck power conversion to the DC input voltage Vin. Therefore, the DC-DC conversion circuit 110 respectively generates the DC bus voltage Vbus and an auxiliary power VCC2 for enabling and supporting the inverting circuit 120 so that the inverting circuit 120 converts the DC bus voltage Vbus into the AC output voltage Vout.

Figure 2:
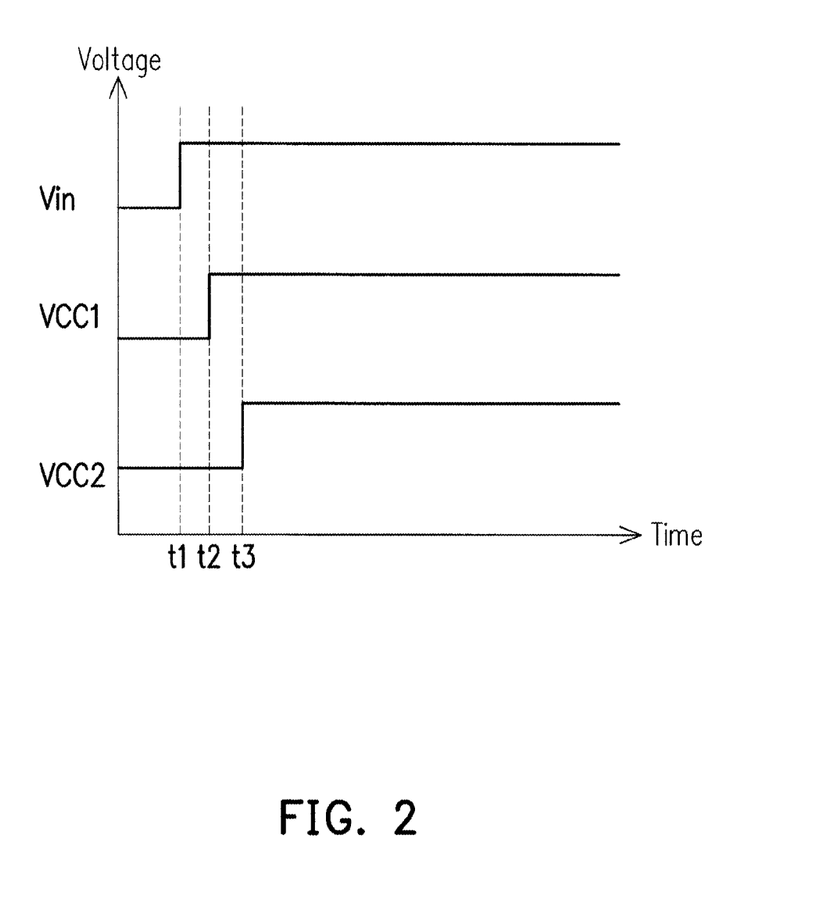
FIG. 2 is an enabling timing schematic diagram of the inverter of the embodiment of FIG. 1.

Based on the above circuit operation, the inverter 100 has an enabling timing as that shown in FIG. 2. FIG. 2 is an enabling timing schematic diagram of the inverter of the embodiment of FIG. 1.

Refer to FIG. 1 and FIG. 2. First, when the DC input side Tin receives the DC input voltage Vin at a time point t1, the auxiliary power circuit 130 receives power from the DC input side Tin for enabling, and the auxiliary power circuit 130 starts to supply the auxiliary power VCC1 to the DC-DC conversion circuit 110 after entering a stable working state at a time point t2. Then, the DC-DC conversion circuit 110 is enabled after receiving the auxiliary power VCC1, and the DC-DC conversion circuit 110 starts to supply the auxiliary power VCC2 to the inverting circuit 120 after entering the stable working state at a time point t3.

In detail, under the structure of the inverter 100, the auxiliary power VCC2 required by the inverting circuit 120 of the post stage is provided by the DC-DC conversion circuit 110, so the auxiliary power circuit 130 is only required to supply power to the DC-DC conversion circuit 110. Further, since the consideration of power supply of the inverting circuit 120 can be exempted from the auxiliary power design, the isolated DC-DC converter (for example, a flyback transformer) as used in a conventional auxiliary power circuit is unnecessary. In the embodiments of present invention, the auxiliary power circuit 130 can be simply implemented by a non-isolated DC-DC converter.

More specifically, the auxiliary power circuit 130 of the present embodiment has the non-isolated circuit structure, compared to the conventional auxiliary power circuit, thus the auxiliary power circuit 130 may have higher power conversion efficiency and simpler circuit design. On the other hand, because the auxiliary power circuit 130 is only required to supply power to the previous-stage circuit (i.e., DC-DC conversion circuit 110), power requirement of the auxiliary power circuit 130 can be less than that of the conventional auxiliary power circuit. The aforementioned features can greatly decrease the power loss of the auxiliary power circuit 130 of the present embodiment, so as to enhance the power conversion efficiency of the whole inverter 100, especially the power conversion efficiency under the light load state.

It should be noticed that detailed circuit configuration of the DC-DC conversion circuit 110 and the inverting circuit 120 of the inverter 100 are not limited by the invention. In other words, the DC-DC conversion circuit 110 may have a half-bridge asymmetric circuit configuration, a half-bridge symmetric circuit configuration, a full-bridge circuit configuration or other applicable circuit configurations, and the inverting circuit 120 has the same, which is not limited by the invention.

Figure 3:
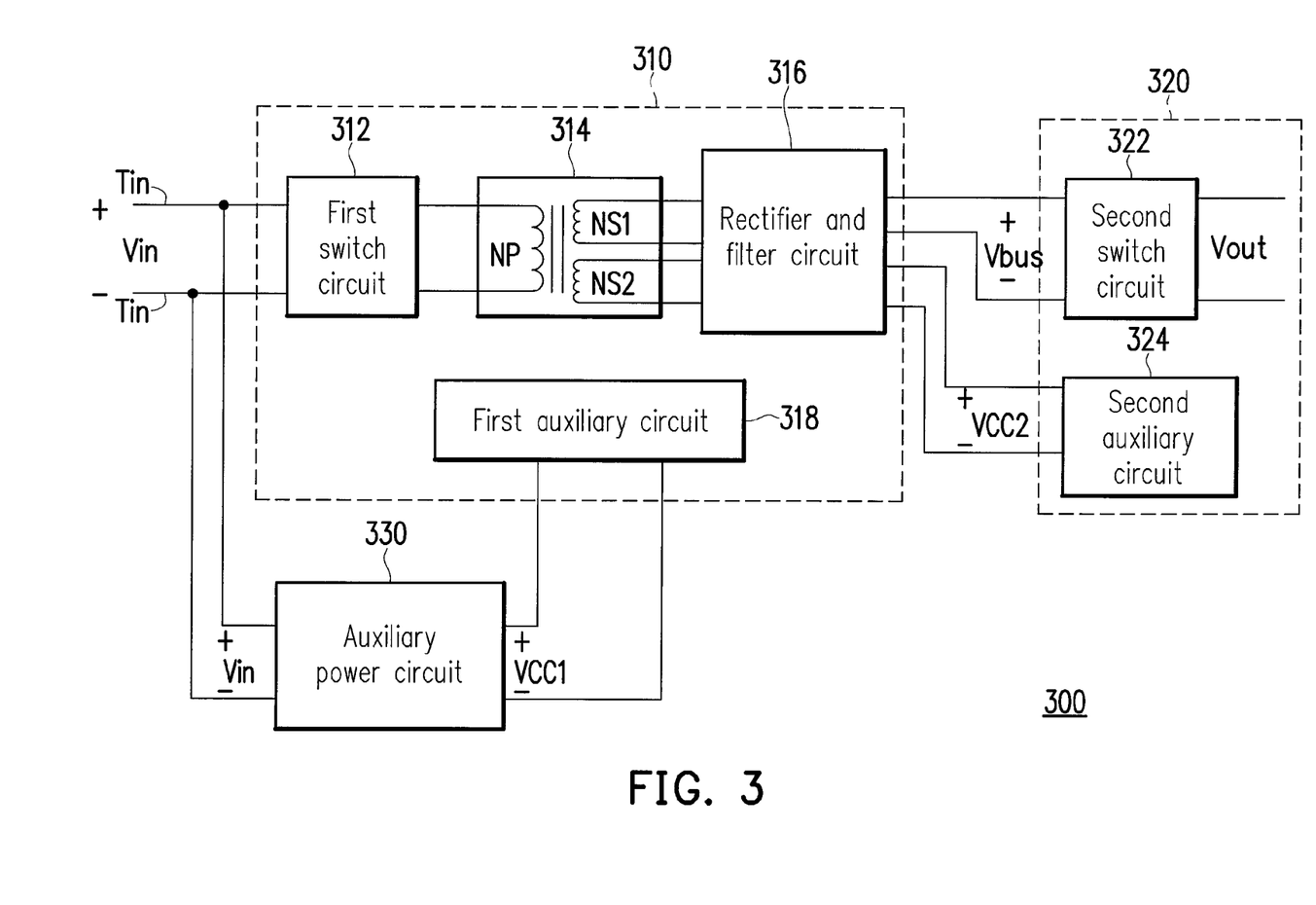
FIG. 3 is a schematic diagram of an inverter according to another embodiment of the invention.

In order to clearly describe the embodiment of the invention, FIG. 3 is a schematic diagram of an inverter according to another embodiment of the invention. Refer to FIG. 3; the inverter 300 includes a DC-DC conversion circuit 310, an inverter 320 and an auxiliary power circuit 330.

In the present embodiment, the DC-DC conversion circuit 310 includes a first switch circuit 312, an isolation transformer 314, a rectifier and filter circuit 316, and a first auxiliary circuit 318. The first switch circuit 314 receives the DC input voltage Vin from the DC input side Tin. The isolation transformer 314 has a primary winding NP and secondary windings NS1 and NS2, where the primary winding NP is coupled to the first switch circuit 312. The rectifier and filter circuit 316 is coupled between the isolation transformer 314 and the inverting circuit 320 for rectifying and filtering outputs of the secondary windings NS1 and NS2, where the rectifier and filter circuit 316 generates the DC bus voltage Vbus according to the output of the secondary winding NS1, and generates the auxiliary power VCC2 according to the output of the secondary winding NS2. The first auxiliary circuit 318 is coupled to the auxiliary power circuit 330, where the first auxiliary circuit 318 operates under the auxiliary power VCC1 to provide a specific auxiliary function.

The inverting circuit 320 includes a second switch circuit 332 and a second auxiliary circuit 324. The second switch circuit 322 is coupled to the secondary winding NS1 via the rectifier and filter circuit 316 for receiving the DC bus voltage Vbus. The second auxiliary circuit 324 is coupled to the secondary winding NS2 via the rectifier and filter circuit 316, where the second auxiliary circuit 324 operates under the auxiliary power VCC2 to provide a specific auxiliary function to the inverting circuit 320.

In the present embodiment, the DC-DC conversion circuit 310 is implemented by an isolated DC-DC converter. The auxiliary power circuit 330 is implemented by a non-isolated DC-DC converter. More specifically, the DC-DC conversion circuit 310 adopts the isolation transformer 314 having a plurality of secondary windings NS1 and NS2 to supply the auxiliary power VCC2, where a magnitude of the auxiliary power VCC2 can be adjusted according to a turns ratio of the primary winding NP and the secondary winding NS2.

The first auxiliary circuit 318 of the present embodiment may include a first control circuit (not shown) configured to control the operation of the first switch circuit 312, and the second auxiliary circuit 324 may include a second control circuit (not shown) configured to control the operation of the second switch circuit 322. The aforementioned first and second control circuit start to operate after receiving the corresponding auxiliary powers VCC1 and VCC2, and generate control signals to control switching of the corresponding switch circuits 312 and 322, so as to regulate power conversion of the DC-DC conversion circuit 310 and the inverting circuit 320.

On the other hand, according to a circuit design requirement of a designer, the first auxiliary circuit 318 and the second auxiliary circuit 320 may include different types of protection circuits, for example, an over voltage protection (OVP) circuit, an over load protection (OLP) circuit or an over current protection (OCP) circuit, etc. Power supply of the control circuit and/or the protection circuit in the first auxiliary circuit 318 are/is provided by the auxiliary power VCC1 outputted by the auxiliary power circuit 330. Power supply of the control circuit and/or the protection circuit in the second auxiliary circuit 324 are/is provided by the auxiliary power VCC2 outputted by the DC-DC conversion circuit 310.

Moreover, in the present embodiment, although the isolation transformer 314 having two secondary windings NS1 and NS2 is taken as an example for description, the invention is not limited thereto. In other embodiments, according to the design of the post-stage inverting circuit 320, the isolation transformer 314 can also be implemented by an isolation transformer having three or more secondary windings, so as to supply the auxiliary power VCC2 having different voltage levels to the inverting circuit 320.

Figure 4:
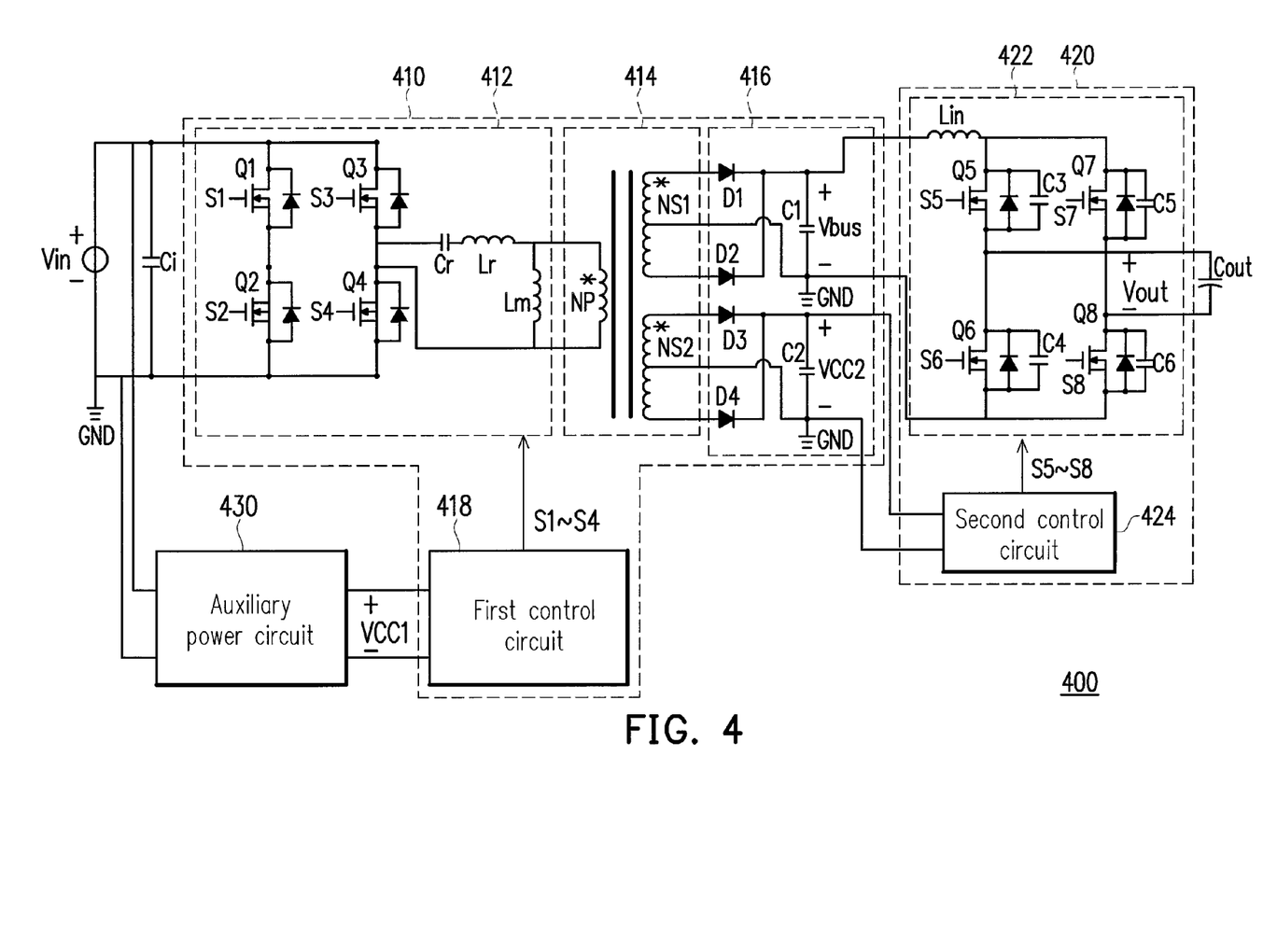
FIG. 4 is a circuit structure schematic diagram of an inverter according to an embodiment of the invention.

A specific circuit structure of the inverter is provided below to describe a power supplying and operation mechanism of the inverter of the invention. Refer to FIG. 4; FIG. 4 is a circuit structure schematic diagram of an inverter according to an embodiment of the invention.

Refer to FIG. 4; the inverter 400 includes a DC-DC conversion circuit 410, an inverting circuit 420 and an auxiliary power circuit 430. In the present embodiment, the DC-DC conversion circuit 410 of the previous stage is, for example, a full-bridge serial resonant converter (which is one kind of the isolated DC-DC conversion circuit), and the inverting circuit 420 of the post stage is, for example, a full-bridge inverter, though the invention is not limited thereto. Moreover, the auxiliary power circuit 430 of the present embodiment can be implemented by a buck integrated circuit (IC) which is integrating a buck converter and a control circuit, though the invention is not limited thereto.

In detail, the DC input voltage Vin is connected in parallel to an input capacitor Ci, and is coupled to the DC-DC conversion circuit 410. The DC-DC conversion circuit 410 includes a first switch circuit 412, an isolation transformer 414, a rectifier and filter circuit 416 and a first control circuit 418. The first switch circuit 412 is composed of switch transistors Q1-Q4, a resonant capacitor Cr and resonant inductors Lr and Lm. The switch transistors Q1-Q4 are coupled between the DC input voltage Vin and the ground GND. The switch transistors Q1 and Q2 are connected in series to form a bridge arm, and the switch transistors Q3 and Q4 are connected in series to form another bridge arm.

In the present embodiment, the auxiliary power circuit 430 is enabled in response to the DC input voltage Vin and then produce the auxiliary power VCC1 (for example, a voltage of 5V, 12V). After the auxiliary power circuit 430 is enabled, the first control circuit 418 generates control signals S1-S4 configured to control the switch transistors Q1-Q4 in response to the auxiliary power VCC1 provided by the auxiliary power circuit 430. The switch transistors Q1-Q4 are respectively controlled by the control signals S1-S4 and are alternatively turned on or turned off in a complementary/switching method, so as to output the DC input voltage Vin to a resonant circuit composed of the resonant capacitor Cr and the resonant inductors Lr and Lm.

The resonant circuit is charged/discharged in response to switching of the switch transistors Q1-Q4, and the isolation transformer 414 respectively generates corresponding output voltages on the secondary windings NS1 and NS2 in response to a voltage variation on the primary winding NP.

The rectifier and filter circuit 416 is, for example, a circuit structure composed of diodes D1-D4 and filter capacitors C1 and C2. The diodes D1 and D2 construct a half-bridge rectifier, which rectifies the output of the secondary winding NS1 to generate the DC bus voltage Vbus. The diodes D3 and D4 construct another half-bridge rectifier, which rectifies the output of the secondary winding NS2 to generate the auxiliary power VCC2. The filter capacitors C1 and C2 are respectively coupled between a common-polarity terminal (i.e., the terminal illustrated a dot) and a center-tapped terminal of the secondary windings NS1 and NS2 in parallel to respectively filter non-DC components of the DC bus voltage Vbus and the auxiliary power VCC2, and respectively provide the DC bus voltage Vbus and the auxiliary power VCC2 to the inverting circuit 420.

The inverting circuit 420 includes a second switch circuit 422 and a second control circuit 424. The second switch circuit 422 is composed of switch transistors Q5-Q8, resonant capacitors C3-C6 and a resonant inductor Lin. The switch transistors Q5-Q8 are coupled between the DC bus voltage Vbus and the ground GND. The switch transistors Q5 and Q6 are connected in series to form a bridge arm, and the switch transistors Q7 and Q8 are connected in series to form another bridge arm.

After the DC-DC conversion circuit 410 is enabled in response to the auxiliary power VCC1 and generates the auxiliary power VCC2, the second control circuit 424 generates control signals S5-S8 configured to control the switch transistors Q5-Q8 in response to the auxiliary power VCC2 provided by the DC-DC conversion circuit 410. The switch transistors Q5-Q8 are respectively controlled by the control signals S5-S8 and are alternatively turned on or turned off in a complementary/switching method, so as to convert the DC bus voltage Vbus into the AC output voltage Vout.

Similar to the aforementioned embodiment, since the auxiliary power VCC2 required by the inverting circuit 420 of the present embodiment is provided by the DC-DC conversion circuit 410 of the previous stage, the auxiliary power circuit 430 is only required to supply the auxiliary power VCC1 to the DC-DC conversion circuit 410 of the previous stage, so that the power requirement and the power loss both can be reduced. Accordingly, the power conversion efficiency of the inverter 400 can be maintained at a higher level even when the inverter 400 is operated under the light load state.

Figure 5:
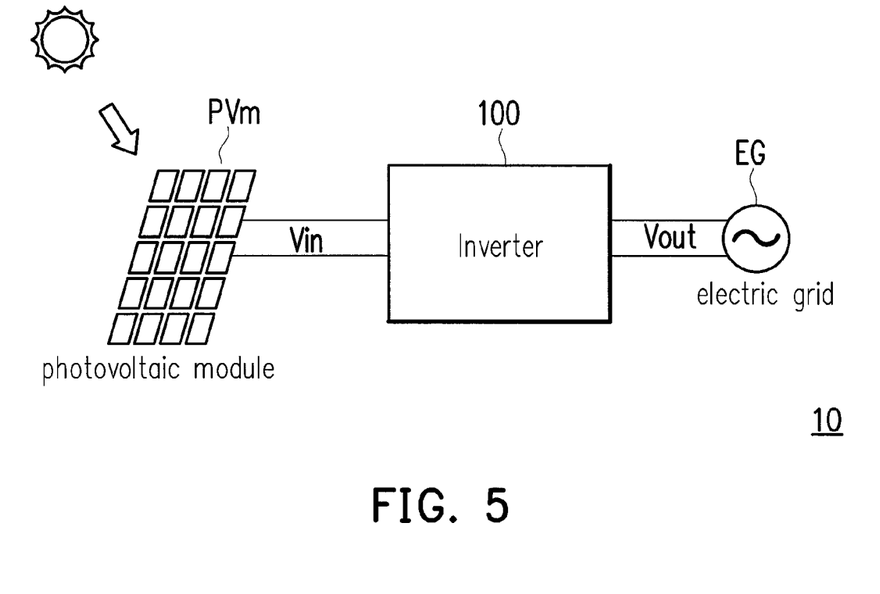
FIG. 5 is a schematic diagram of a photovoltaic grid-connected system applying an inverter according to an embodiment of the invention.

FIG. 5 is a schematic diagram of a photovoltaic grid-connected system applying the aforementioned inverter 100 according to an embodiment of the invention. Refer to FIG. 5; the photovoltaic grid-connected system 10 includes a photovoltaic module PVm and the inverter 100. In the present embodiment, an output of the photovoltaic module PVm is taken as the DC input voltage Vin of the inverter 100. The AC output voltage Vout generated by the inverter 100 is provided to a post electric grid EG. Since the power conversion efficiency of the inverter can be effectively enhanced when the inverter 100 operates under the light load state, even when an intensity of the sunlight is weakened due to an influence of weather, the system efficiency of the whole photovoltaic grid-connected system 100 is not greatly influenced.

Figure 6:
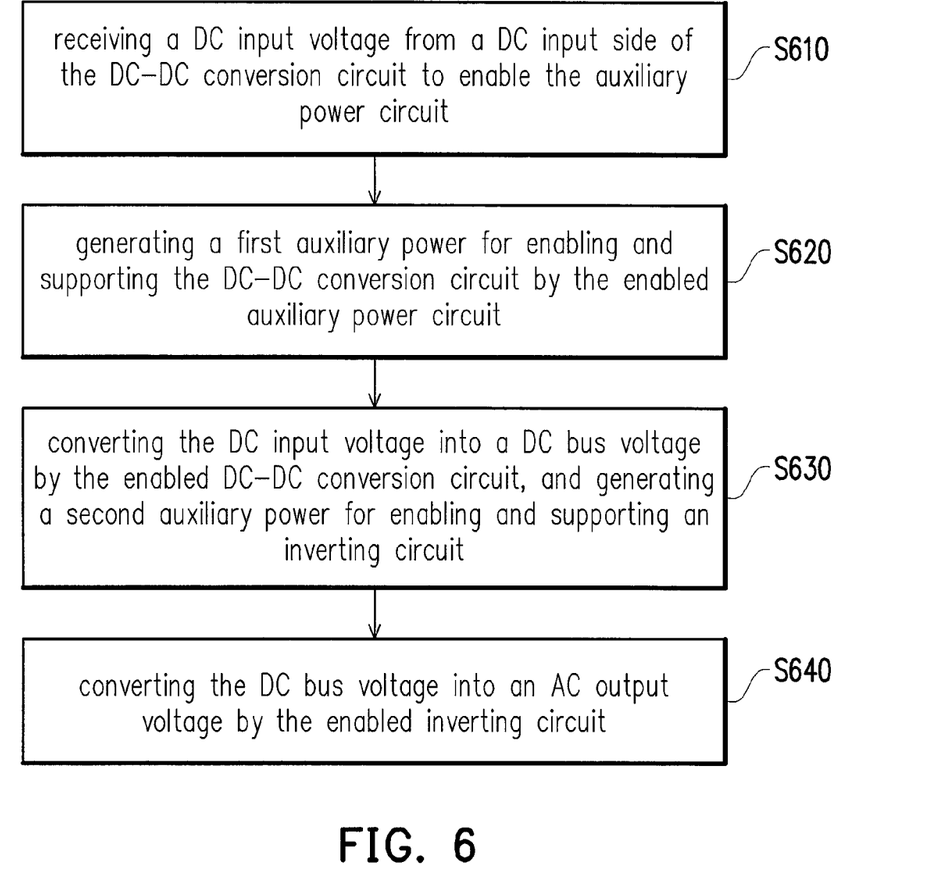
FIG. 6 is a flowchart illustrating a power supplying method of an inverter according to an embodiment of the invention.

FIG. 6 is a flowchart illustrating a power supplying method of an inverter according to an embodiment of the invention. The power supplying method of the present embodiment is adapted to the inverter 100, the inverter 300 or the inverter 400 of the aforementioned embodiment. Refer to FIG. 6, the power supplying method includes following steps. A DC input voltage is received from a DC input side of a DC-DC conversion circuit (for example, 110, 310, 410) to enable an auxiliary power circuit (for example, 130, 330, 430) (step S610). A first auxiliary power required by the DC-DC conversion circuit is generated by the enabled auxiliary power circuit to enable and support the DC-DC conversion circuit (step S620). The DC input voltage is converted into a DC bus voltage by the enabled DC-DC conversion circuit, and a second auxiliary power required by an inverting circuit (for example, 120, 320, 420) is generated to enable and support the inverting circuit (step S630). The DC bus voltage is converted into an AC output voltage by the enabled inverting circuit (step S640).

Those skilled in the art can learn enough instructions and recommendations of the power supplying method of the embodiment of FIG. 6 from the descriptions of FIG. 1-FIG. 5, and detailed description thereof is not repeated.

In summary, the invention provides an inverter and a power supplying method and an application using the same. In the inverter, the DC-DC conversion circuit of the previous stage is used to generate the auxiliary power required by the inverting circuit of the post stage, such that the auxiliary power circuit is only required to supply the auxiliary power to the DC-DC conversion circuit. Since the auxiliary power circuit is unnecessary to supply power to the inverting circuit, the auxiliary power circuit is adapted to be implemented by a non-isolated DC-DC converter, so as to decrease the power loss of the auxiliary power circuit.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An inverter, comprising:
   a direct current (DC)-DC conversion circuit, receiving a DC input voltage from a DC input side, and converting the DC input voltage into a DC bus voltage;
   an inverting circuit, coupled to the DC-DC conversion circuit, and configured to convert the DC bus voltage into an alternating current (AC) output voltage; and
   an auxiliary power circuit, coupled to the DC-DC conversion circuit, and receiving the DC input voltage from the DC input side,
   wherein the auxiliary power circuit is enabled in response to the DC input voltage, and the auxiliary power circuit generates a first auxiliary power for enabling the DC-DC conversion circuit after the auxiliary power circuit is enabled, and wherein the DC-DC conversion circuit is enabled in response to the first auxiliary power, and the DC-DC conversion circuit generates a second auxiliary power for enabling the inverting circuit after the DC-DC conversion circuit is enabled, such that the inverting circuit is enabled in response to the second auxiliary power and generates the AC output voltage.

2. The inverter as claimed in claim 1, wherein the DC-DC conversion circuit comprises:
a first switch circuit, receiving the DC input voltage from the DC input side;
an isolation transformer, having a primary winding, a first secondary winding and a second secondary winding, wherein the primary winding is coupled to the first switch circuit;
a rectifier and filter circuit, coupled between the isolation transformer and the inverting circuit, and configured to rectify and filter outputs of the first and the second secondary windings, wherein the rectifier and filter circuit generates the DC bus voltage according to the output of the first secondary winding, and generates the second auxiliary power according to the output of the second secondary winding; and
a first auxiliary circuit, coupled to the auxiliary power circuit, wherein the first auxiliary circuit operates under the first auxiliary power to provide a first auxiliary function to the DC-DC conversion circuit.

3. The inverter as claimed in claim 2, wherein the inverting circuit comprises:
a second switch circuit, coupled to the first secondary winding via the rectifier and filter circuit for receiving the DC bus voltage; and
a second auxiliary circuit, coupled to the second secondary winding via the rectifier and filter circuit, wherein the second auxiliary circuit operates under the second auxiliary power to provide a second auxiliary function to the inverting circuit.

4. The inverter as claimed in claim 3, wherein the first auxiliary circuit comprises a first control circuit configured to control the operation of the first switch circuit, and the second auxiliary circuit comprises a second control circuit configured to control the operation of the second switch circuit.

5. The inverter as claimed in claim 3, wherein at least one of the first auxiliary circuit and the second auxiliary circuit comprises at least one of an over voltage protection circuit, an over load protection circuit and an over current protection circuit.

6. The inverter as claimed in claim 1, wherein the DC-DC conversion circuit is an isolated DC-DC converter.

7. The inverter as claimed in claim 1, wherein the auxiliary power circuit is a non-isolated DC-DC converter.

8. A photovoltaic grid-connected system, comprising:
a photovoltaic module; and
an inverter, coupled to the photovoltaic module with a DC input side, and receiving the output of the photovoltaic module as a DC input voltage, wherein the inverter comprises:
a DC-DC conversion circuit, receiving the DC input voltage from the DC input side, and converting the DC input voltage into a DC bus voltage;
an inverting circuit, coupled to the DC-DC conversion circuit, and configured to convert the DC bus voltage into an alternating current (AC) output voltage; and an auxiliary power circuit, coupled to the DC-DC conversion circuit, and receiving the DC input voltage from the DC input side, wherein the auxiliary power circuit is enabled in response to the DC input voltage, and the auxiliary power circuit generates a first auxiliary power for enabling the DC-DC conversion circuit after the auxiliary power circuit is enabled, and wherein the DC-DC conversion circuit is enabled in response to the first auxiliary power, and the DC-DC conversion circuit generates a second auxiliary power for enabling the inverting circuit after the DC-DC conversion circuit is enabled, such that the inverting circuit is enabled in response to the second auxiliary power and generates the AC output voltage.

9. The photovoltaic grid-connected system as claimed in claim 8, wherein the DC-DC conversion circuit comprises:
a first switch circuit, receiving the DC input voltage from the DC input side;
an isolation transformer, having a primary winding, a first secondary winding and a second secondary winding, wherein the primary winding is coupled to the first switch circuit, and the first secondary winding is coupled to the inverting circuit for providing the DC bus voltage;
a rectifier and filter circuit, coupled between the second secondary winding and the inverting circuit, and generating the second auxiliary power; and
a first auxiliary circuit, coupled to the auxiliary power circuit, wherein the first auxiliary circuit operates under the first auxiliary power to provide a first auxiliary function to the DC-DC conversion circuit.

10. The photovoltaic grid-connected system as claimed in claim 9, wherein the inverting circuit comprises:
a second switch circuit, coupled to the first secondary winding via the rectifier and filter circuit for receiving the DC bus voltage; and
a second auxiliary circuit, coupled to the second secondary winding via the rectifier and filter circuit, wherein the second auxiliary circuit operates under the second auxiliary power to provide a second auxiliary function to the inverting circuit.

11. The photovoltaic grid-connected system as claimed in claim 10, wherein the first auxiliary circuit comprises a first control circuit configured to control the operation of the first switch circuit, and the second auxiliary circuit comprises a second control circuit configured to control the operation of the second switch circuit.

12. The photovoltaic grid-connected system as claimed in claim 10, wherein at least one of the first auxiliary circuit and the second auxiliary circuit comprises at least one of an over voltage protection circuit, an over load protection circuit and an over current protection circuit.

13. A power supplying method of an inverter, wherein the inverter comprises a DC-DC conversion circuit, an inverting circuit and an auxiliary power circuit, the power supplying method comprising:
receiving a DC input voltage from a DC input side of the DC-DC conversion circuit to enable the auxiliary power circuit;
generating a first auxiliary power for enabling and supporting the DC-DC conversion circuit by the enabled auxiliary power circuit;
converting the DC input voltage into a DC bus voltage by the enabled DC-DC conversion circuit, and generating a second auxiliary power for enabling and supporting an inverting circuit; and converting the DC bus voltage into an alternating current (AC) output voltage by the enabled inverting circuit.

\* \* \* \* \*